United States Patent
Perlin et al.

(10) Patent No.: US 7,810,153 B2
(45) Date of Patent: Oct. 5, 2010

(54) CONTROLLING EXECUTION OF COMPUTER APPLICATIONS

(75) Inventors: Eric C. Perlin, Redmond, WA (US); Klaus U. Schutz, Kirkland, WA (US); Paul J. Leach, Seattle, WA (US); Peter T. Brundrett, Seattle, WA (US); Thomas C. Jones, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1039 days.

(21) Appl. No.: 11/046,607

(22) Filed: Jan. 28, 2005

(65) Prior Publication Data

US 2007/0186112 A1    Aug. 9, 2007

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)

(52) U.S. Cl. .............. 726/20; 726/2; 726/16; 726/17; 726/19

(58) Field of Classification Search .......... 726/2, 726/16, 17, 19, 20
See application file for complete search history.

(56) References Cited

U.S. PATENT DOCUMENTS

| | | | |
|---|---|---|---|
| 4,984,272 A * | 1/1991 | McIlroy et al. ............. | 726/17 |
| 5,577,209 A * | 11/1996 | Boyle et al. .............. | 726/4 |
| 5,748,960 A * | 5/1998 | Fischer ................. | 719/316 |
| 5,892,904 A | 4/1999 | Atkinson et al. | |
| 6,151,019 A * | 11/2000 | Watanabe et al. .......... | 715/733 |
| 6,351,813 B1 * | 2/2002 | Mooney et al. ............ | 713/185 |
| 6,463,535 B1 * | 10/2002 | Drews ................... | 713/176 |
| 6,505,300 B2 * | 1/2003 | Chan et al. ............... | 713/164 |
| 6,694,434 B1 * | 2/2004 | McGee et al. ............. | 713/189 |
| 6,704,872 B1 | 3/2004 | Okada | |
| 6,715,077 B1 * | 3/2004 | Vasudevan et al. ......... | 713/191 |
| 6,742,120 B1 * | 5/2004 | Markakis et al. .......... | 713/184 |
| 6,850,943 B2 * | 2/2005 | Teixeira et al. ............ | 707/10 |
| 7,055,040 B2 * | 5/2006 | Klemba et al. ............ | 713/156 |
| 7,159,240 B2 * | 1/2007 | England et al. ............. | 726/6 |
| 7,243,369 B2 | 7/2007 | Bhat et al. | |
| 7,260,848 B2 | 8/2007 | Zimmer | |
| 7,269,732 B2 * | 9/2007 | Kilian-Kehr ............. | 713/172 |
| 7,299,364 B2 * | 11/2007 | Noble et al. ............. | 713/189 |
| 7,308,580 B2 | 12/2007 | Nelson et al. | |
| 7,322,042 B2 * | 1/2008 | Srinivasan et al. .......... | 726/17 |
| 7,360,082 B1 | 4/2008 | Berthold et al. | |
| 2004/0078565 A1 | 4/2004 | Hofmeister et al. | |
| 2004/0139349 A1 * | 7/2004 | Henn et al. .............. | 713/201 |
| 2004/0172542 A1 * | 9/2004 | Minemura ............... | 713/176 |
| 2005/0071641 A1 | 3/2005 | Basibes et al. | |
| 2005/0091658 A1 | 4/2005 | Kavalam et al. | |
| 2005/0182958 A1 * | 8/2005 | Pham et al. .............. | 713/200 |
| 2005/0268014 A1 | 12/2005 | Geib et al. | |

* cited by examiner

*Primary Examiner*—Edan Orgad
*Assistant Examiner*—James Turchen
(74) *Attorney, Agent, or Firm*—Lee & Hayes, PLLC

(57) ABSTRACT

Systems and methods are described that control attempts made by an application to access data. In one embodiment, the application is associated with a security token that includes an application ID. In operation, the system receives a request, initiated by the application, for access to the data. The system is configured to evaluate the request for access based in part on comparison of the security token and a listing of approved application IDs associated with the data.

15 Claims, 9 Drawing Sheets

CONTROLLING EXECUTION OF COMPUTER APPLICATIONS

RELATED APPLICATIONS

This patent application is related to U.S. patent application Ser. No. 11/046,281, titled "Controlling Computer Applications' Access to Data", filed on even day herewith, commonly assigned herewith, and hereby incorporated by reference.

TECHNICAL FIELD

The present disclosure generally relates to control over computer applications' access to data, and more particularly to associating a strong application ID with an application and allowing that application access to data only when the strong application ID is contained within an access control list associated with the data.

BACKGROUND

Existing general purpose operating systems generally control access to data, such as files, objects, directories, etc., by configuring users as security principals upon presentation of a user ID. When a user executes an application, the user's ID is included within a security token associated with the application that is located within the kernel of the operating system. When the application requests data, the user's ID within the security token is compared to an Access Control List (ACL) associated with the data. Where the user's ID is contained in the ACL, and the ACL grants the desired access, the application is provided access to the data.

In operation, the above-described configuration provides any application executed by the user to have the permissions owned by the user. In effect, the application can do anything—such as reading, writing, utilizing (e.g. using email addresses) and erasing data—that the user has permission (from the operating system) to do.

Thus, if the user inadvertently executes a malicious application, that application will be able to steal, erase, maliciously utilize or otherwise damage files to which the user has permissions. This puts the user's data at substantial risk every time an unknown application is executed. The risk is compounded by attachments to email messages and files downloaded over the internet.

Conventional operating systems have sought to limit the damage that results from execution of malicious programs by structuring permissions such that many important files cannot be damaged by the user. Such a system can prevent a malicious application executed by the user from damaging important system files. For example, the "administrator" may be given more permissions than the "user," who in turn may be given more permissions than a "guest" user. In particular, the administrator may have permission to alter any file; the user may have permission only to alter the user's files, and the guest user may be barred from accessing the user's files and data. Such a structure has the benefit of limiting the damage that an application, having been executed by users with lesser privileges, can do. That is, while a malicious application executed by the user may damage, expose or delete the user's files, objects and/or data, many system files may be protected from the application because the ACLs on the system files restrict access to the User ID.

However, despite the protection given to some files, conventional operating systems have failed to provide adequate protection to many of the user's files, data, etc. A particularly frequent example of this breakdown involves failure to protect the user's list of email addresses. This is particularly unfortunate, because access to a user's email address list allows a malicious application to generate bogus email messages or spread via an email attachment.

Accordingly, a need exists for new and better systems and methods wherein computer environments are configured to protect data, files objects, etc. More particularly, a need exists for improvements to operating systems, wherein data, objects, files, etc, are better protected.

SUMMARY

Systems and methods are described that control attempts made by an application to access data. In one embodiment, the application is associated with a security token that includes an application ID. In operation, the system receives a request, initiated by the application, for access to the data. The system is configured to evaluate the request for access based in part on comparison of the security token and a listing of approved application IDs associated with the data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

The following discussion is directed to systems and methods that control attempts made by an application to access data. In one embodiment, the application is associated with a security token including an application ID. The application is also associated with a user, having a user ID, who executed the application. In operation, the system evaluates a request from the application for access to the data. The request is allowed or rejected based in part on comparison of the application ID from within the security token to a listing of approved application IDs. In other embodiments, the user ID is also compared to a listing of approved user IDs associated with the data. Where both the application ID and the user ID are found in the listing of approved application IDs and user IDs associated with the data, the application is given access to the data. In a principle advantage of the system and method of operation, applications are prevented from accessing data for which they are not authorized to use. This prevents, for example, an application from accessing the email address list on a computer unless that list is configured to allow the application to make such an access. Accordingly, computer data is better protected against misuse and corruption.

The following discussion is also directed to systems and methods that control the execution of applications. In one embodiment, a process-identifying security function is called by the CreateProcess API or a similar operating system structure. If the process-identifying security function is able to obtain a strong application ID for the application, and to locate that strong application ID within a database, the application is allowed to execute. In a further embodiment, the application is allowed to execute if the user provides a weak application ID. Allowing an application having only a weak application ID to execute is particularly useful for "legacy" applications in existence prior to implementation of the teachings discussed herein.

Exemplary Apparatus

Figure 1:
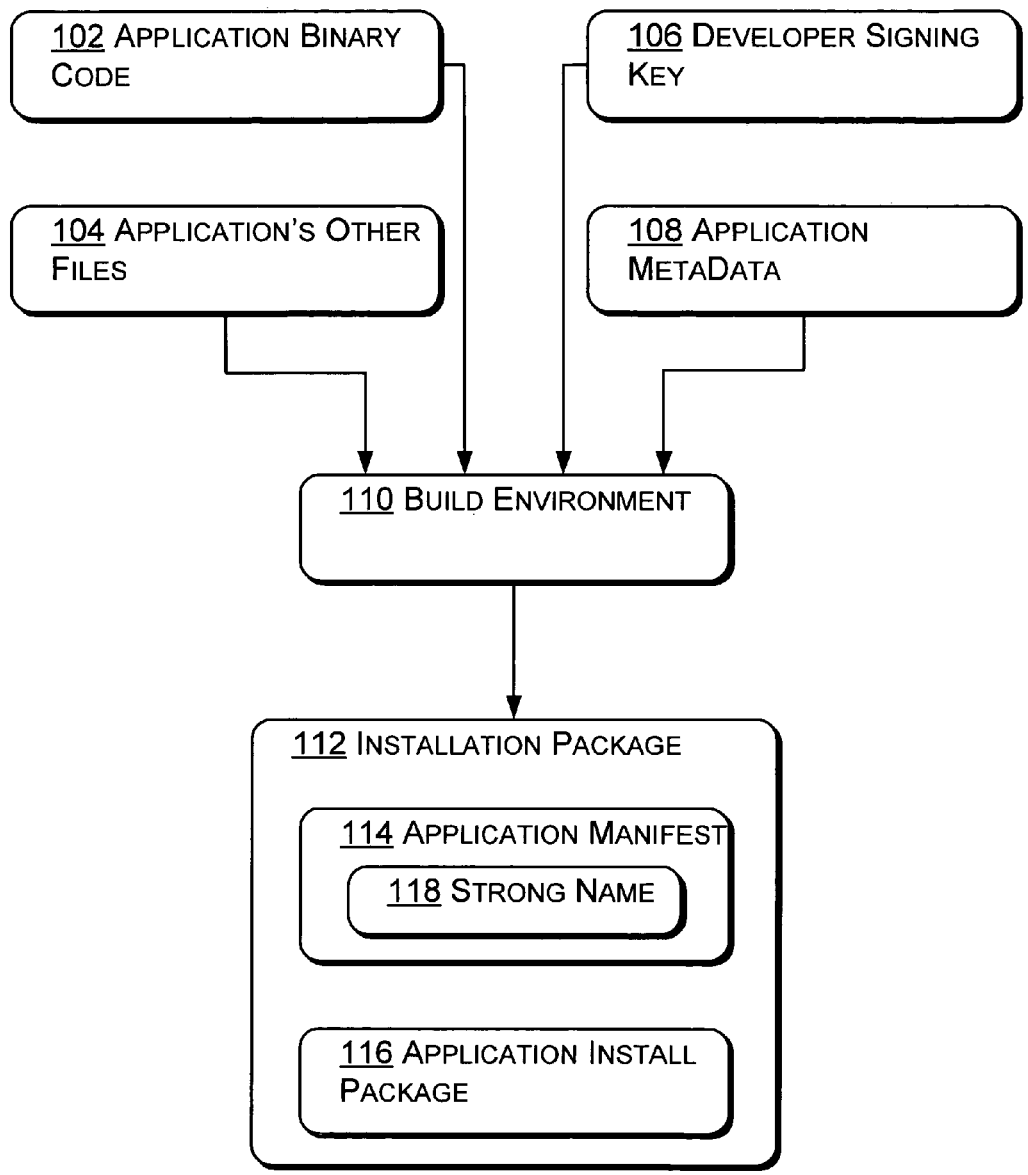
FIG. 1 illustrates an exemplary environment configured to allow a software publisher (developer) to bind information about the application, data, and identity information to an application.

FIG. 1 illustrates an exemplary environment configured to allow a publisher to bind information about the application, data, and trust information to an application and to create an install package associated with an application. The install package may be configured according to different formats, but in many embodiments is an install CD associated with shrink-wrap software.

The application binary code 102 and any other required files 104 are developed in a conventional manner using a development environment, one example of which is Microsoft's® Visual Studio®. The developer creates a developer signing key 106, which is held in secret, thereby allowing creation of a strong name for the application. The application metadata 108 includes may include, for example, the application's name, identity and publication key, etc.

A build environment 110 receives the application binary code 102, files 104, developer signing key 106 and metadata 108. Using these inputs, the build environment 110 creates the installation package 112. The installation package may be configured for Internet download, one or more CDs, or another format, as desired. In the example of FIG. 1, the installation package 112 includes an application manifest 114 and the application install package 116. An installation package created at this stage is not yet trusted since it has not yet been signed.

In some implementations, the developer signing key 106 is used within the build environment 110 to produce a strong name 118, which can be located within the application manifest 114. The strong name 118 is the signature/public key associated with the developer signing key 106. In some configurations, a strong application ID (seen at 504 in FIG. 5) can be derived from the strong name 118.

Figure 2:
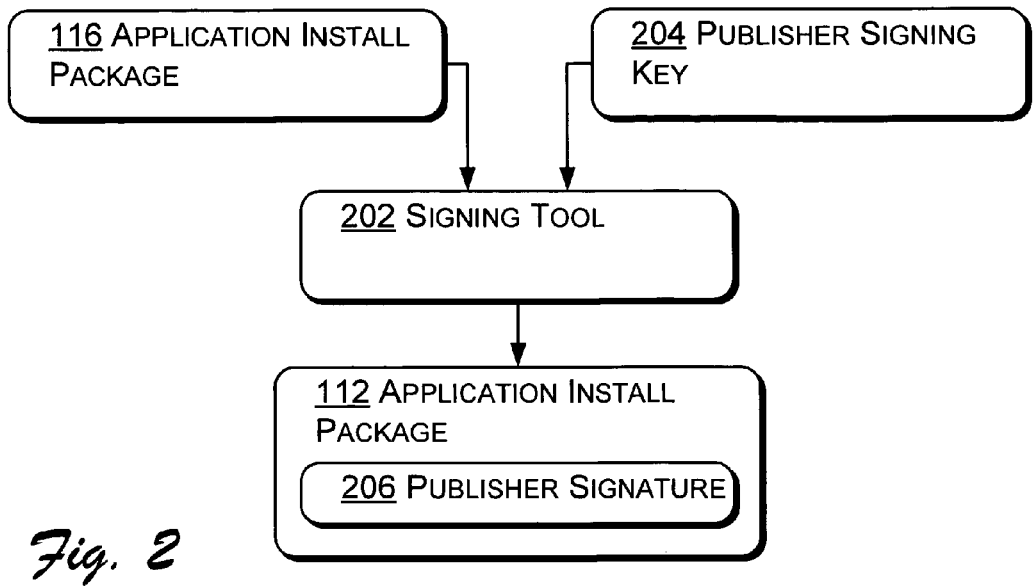
FIG. 2 illustrates exemplary data flow used to package an application for installation with trusted publishers signature.

FIG. 2 illustrates exemplary data flow used to install an application with a strong application ID. In the embodiment of FIG. 2, the unsigned application install package 116 and the publisher signing key 204 are provided to the signing tool 202, which creates a signed application install package 112. The signing tool 202 then applies a publisher signature 206 to the application install package 112. The publisher signature 206 is configured to provide assurance to users of the application that the application is what the publisher purports it to be. Accordingly, the signed application 112 provides greater security for the user than is the case for unsigned applications when the package is delivered to the user by a trusted publisher.

Figure 3:
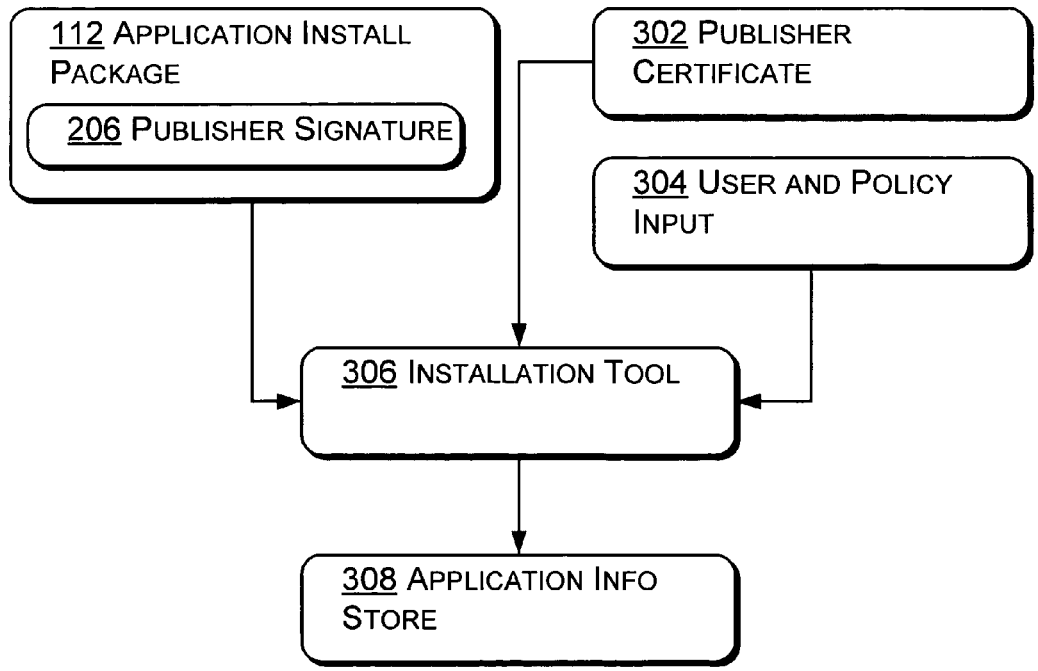
FIG. 3 illustrates an example of an installation procedure wherein the application with a trusted publisher's signature and optionally a strong application ID is installed onto a local computer.

FIG. 3 illustrates an example of an installation procedure wherein the application is installed onto a local computer. The application install package 112 is copied onto a computer where the publisher signature 206 in the install package 112 is validated against the publisher's certificate 302, which has been previously installed on the computer. Alternatively, the publisher certificate 302 could chain to a root certificate installed on the computer and configured as a trusted certificate authority.

The publisher certificate 302, the user and policy input 304, and the application install package 112, including publisher signature 206, are sent to an installation tool 306. The installation tool checks local machine policy and any user input and creates an application info store 308.

Figure 4:
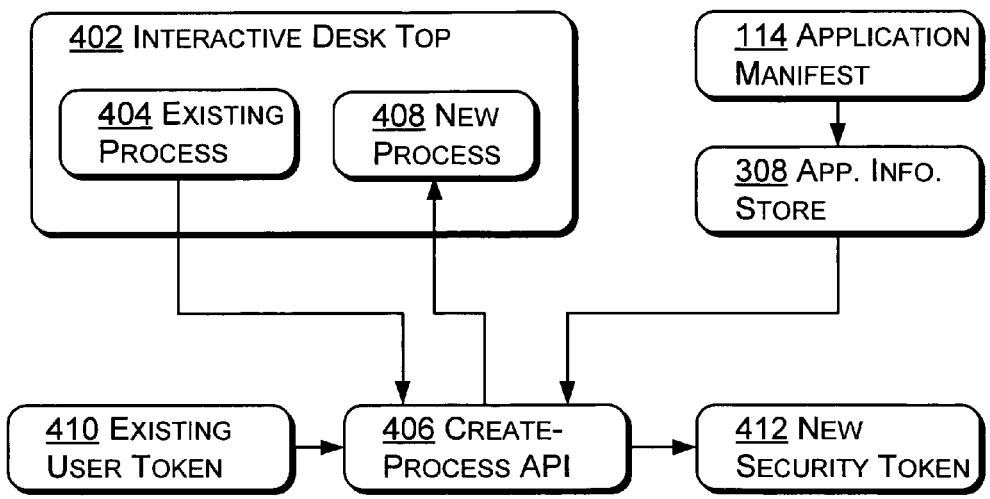
FIG. 4 illustrates an example of a process by which execution of an application having a strong application ID is started.

FIG. 4 illustrates an example of a process by which execution of an application having a strong application ID commences. At this point in the process, data from the application manifest 114 has already been stored in the application info store 308. In the example shown, an interactive desktop 402 is running an existing process 404. In an alternative example, the existing process 404 may have been executed at a command line. A security token 410 is generated as part of the process of logging the user on. When the existing process 404 attempts to create a new process 408, the CreateProcess API 406 responds by accessing the existing user's security token 410 together with information from the application info store 308. The CreateProcess API 406 then creates a new security token 412 for the new process 408, which includes the information of security token 410, augmented with the application ID(s). The security token 412 is associated with the new process 408 in the kernel of the operating system running on the system. The security token 412 associated with the new process 408 includes the application ID provided by the application info store 308, and may include the user's ID. Accordingly, creation of the security token 412 configures the application as a security principal.

In one example, the existing process 404 may respond to the user double-clicking an icon by generating the new process 408 associated with the icon using information from the application info store 308. The existing user token 410 is used together with information from the application info store 308 to create the new security token 412, which is associated with the new process 408 in the kernel. The new security token 412 may include the application ID provided by the application info store 308 which thereby configures the application as a security principal.

Figure 5:
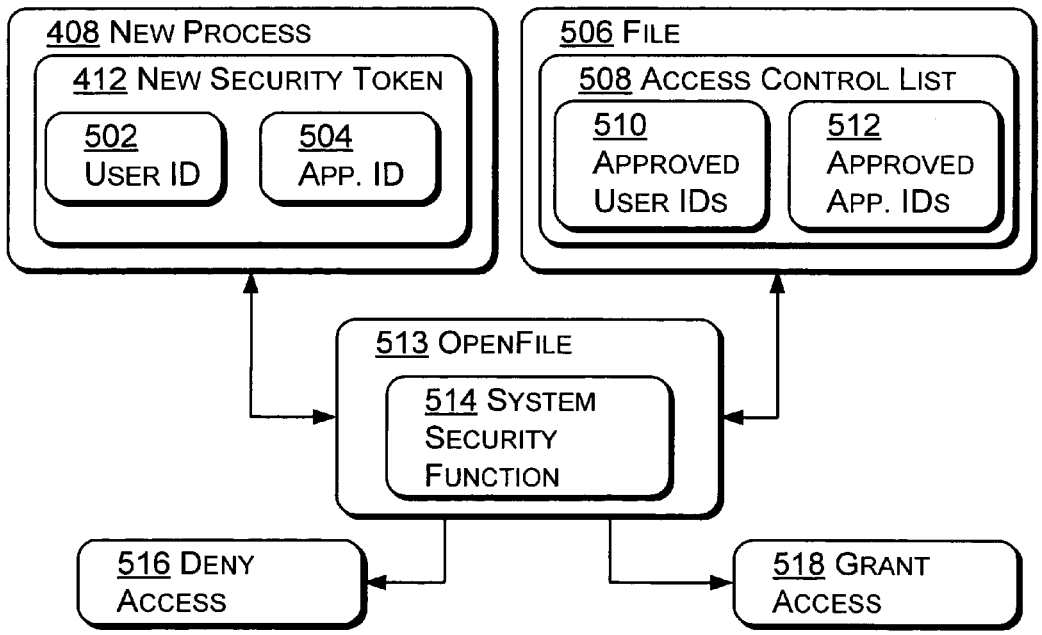
FIG. 5 illustrates an example of an environment within which an operating system security mechanism determines whether an application is allowed to access a data file.

FIG. 5 illustrates an exemplary embodiment wherein an operating system security mechanism determines whether an application running in a process is allowed to access a data file. The security mechanism is configured to base the determination, at least in part, on whether the application is configured as a security principal with respect to the data requested. In one embodiment, the user ID and the application ID contained within the new security token 412 are both compared to the access control list (ACL) 508 associated with the data file. In this embodiment, the correct user ID and also the correct application ID are both required before access to the file is allowed.

Continuing to refer to FIG. 5, the new process 408 represents an application (such as that created in the discussion of FIG. 4) operating on a computer system. File 506 may reside locally on the computer system or remotely on an alternate computer system. The new process 408 is associated with a new security token 412, typically in the kernel of the operating system. The new security token 412 includes a user ID 502 and an application ID 504. Where the application ID 504 is cryptographically verified, it can be considered a strong application ID. Thus, the application ID 504 may be strong or weak, depending on whether it has been cryptographically verified. In a somewhat different implementation, a strong application ID may be derived from the strong name 118 (FIG. 1). If the application running in process 408 requests access to data in the file 506, the application calls a function such as OpenFile 513 (in the example of a Windows® environment) which obtains authorization from a system security function 514.

Upon receiving the request, the system security function 514 examines the access control list (ACL) 508 of the file 506. In one embodiment, if the user ID 502 associated with the application 408 is found in the list of approved user IDs 510 and also the application ID 504 associated with the application 408 is found in the list of approved application IDs 512 then access is permitted 518. If one or more of the IDs 502, 504 from the security token 412 are not found in the ACL 508, then access is rejected 516. In another embodiment, the application ID 504 alone is checked against the approved application IDs 512 to determine access permission.

FIG. 5 illustrates how an application can be configured as a security principal with respect to data such as file 506. Where application 408 is a security principal having an application ID 504 on the approved application ID list 512, access to file 506 will be allowed. This allows files 506 to be configured to prevent access by all but those application(s) that should be permitted access. Accordingly, those application(s) are security principals with respect to the file, data or other object.

Figure 6:
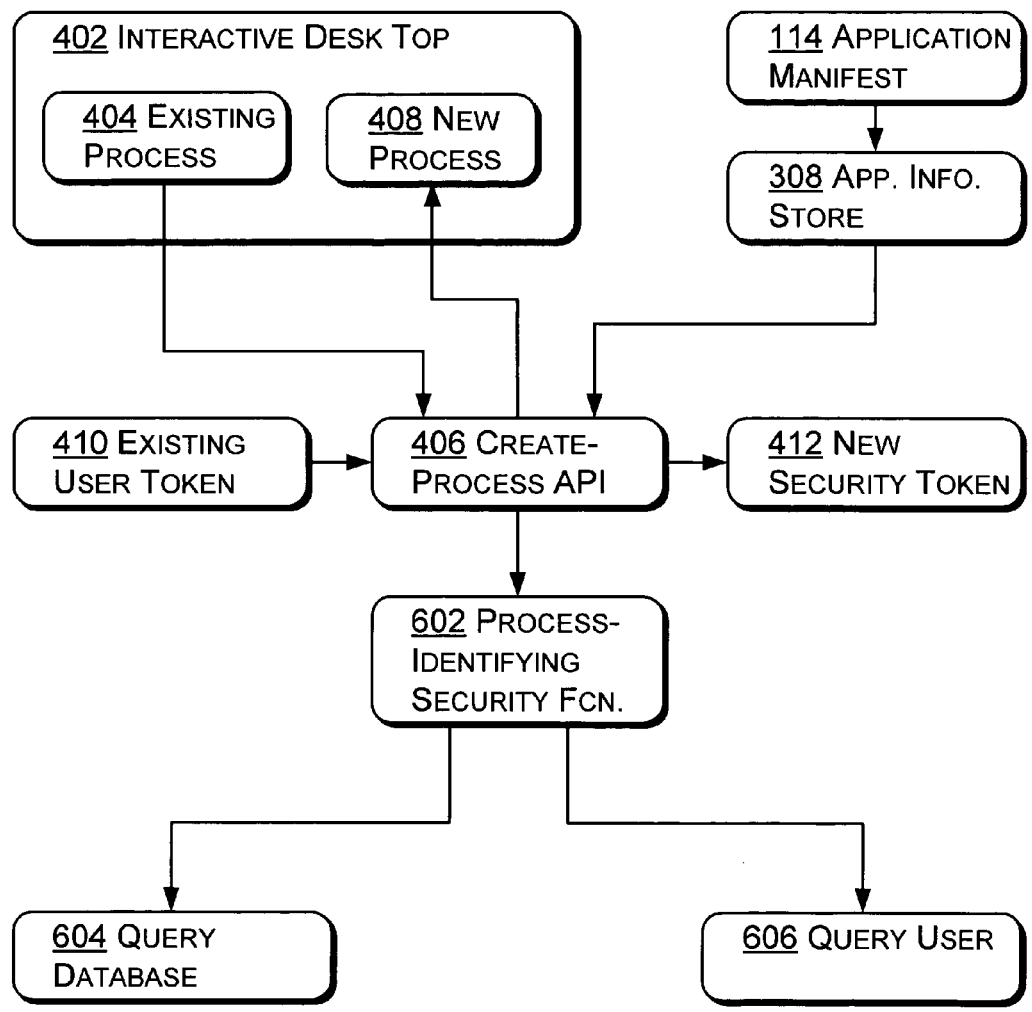
FIG. 6 illustrates an example of an environment within which an operating system security function bases a determination of whether an application is allowed to execute on whether the application can be identified.

FIG. 6 illustrates an example of an environment within which an operating system security function bases a determination of whether an application is allowed to execute on whether the application can be identified. More particularly, the system security mechanism is configured to base the determination, at least in part, on whether the application has a strong application ID, a weak application ID or no application ID. In one embodiment, the CreateProcess API calls to the security function to determine if a new process to be created has a strong application ID. If the security function determines that the new process does have a strong application ID, then the new process is created. Otherwise, the new process is not created. Accordingly, the decision to allow or prevent the application from running is made at the time of execution, and only processes that are positively identified are actually executed and run.

FIG. 6 includes elements previously introduced in the discussion of FIG. 4. However, FIG. 6 has been extended to include a process-identifying security function 602. The process-identifying security function 602 is configured to review an application ID associated with the new process 408 and to evaluate the application ID against a database 604 containing both weak and also strong application IDs associated with processes having permission to operate on the computer. The process-identifying security function 602 is further configured to provide permission to the CreateProcess API 406 to create the new process 408 where the application ID is identified by the database 604 as a strong application ID of a process having permission to operate on the computer. Accordingly, in one embodiment, the process-identifying security function 602 provides a structure that requires provision of a strong, cryptographically based, application ID as a prerequisite to execution of the application.

FIG. 6 additionally illustrates that in a further embodiment, the process-identifying security function 602 may alternatively be configured, upon failure of the database 604 to identify a strong application ID of the new process 408, to establish a weak ID for the new process. The weak application ID may be obtained from the database 604 or a user query 606, wherein the user provides a weak application ID for the application. Accordingly, if the process identifying security function 602 is able to establish the weak ID for the new process, the process-identifying security function 602 is configured to provide permission to the CreateProcess API 406 to create the new process 408. In one implementation of this embodiment, the process-identifying security function 602 is configured to query 606 the user to identify, and essentially, to "vouch" for the new process, thereby giving the application a weak identity. In a second implementation of this embodiment, the process-identifying security function 602 is configured to obtain the weak application ID from the database 604, if present. When a weak ID can be established for the application, the new process 408 is created. Accordingly, the process-identifying security function 602 provides a method by which a weak ID may be created for "legacy" applications (i.e. application created—typically before implementation of the teachings herein—without strong, cryptographically secure, application IDs), thereby allowing such applications to be run.

Referring again to FIG. 6, another characteristic of the process-identifying security function 602 is that it is configured to prevent the CreateProcess API 406 from creating the new process 408 if no application ID (or an unsatisfactory application ID) is established for the new process.

Exemplary Methods

Exemplary methods for implementing aspects of controlling computer applications' access to data will now be described with primary reference to the flow diagrams of FIGS. 7-12. The methods apply generally to the operation of exemplary components discussed above with respect to FIGS. 1-6. The elements of the described methods may be performed by any appropriate means including, for example, hardware logic blocks on an ASIC or by the execution of processor-readable instructions defined on a processor-readable medium.

A "processor-readable medium," as used herein, can be any means that can contain or store instructions for use by or execution by a processor. A processor-readable medium can be, without limitation, an electronic, magnetic, optical or electromagnetic medium. More specific examples of a processor-readable medium include, among others, a portable computer diskette, a random access memory (RAM), a read-only memory (ROM), an erasable programmable-read-only memory (EPROM or Flash memory), a rewritable compact disc (CD-RW), and a portable compact disc read-only memory (CDROM).

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Figure 7:
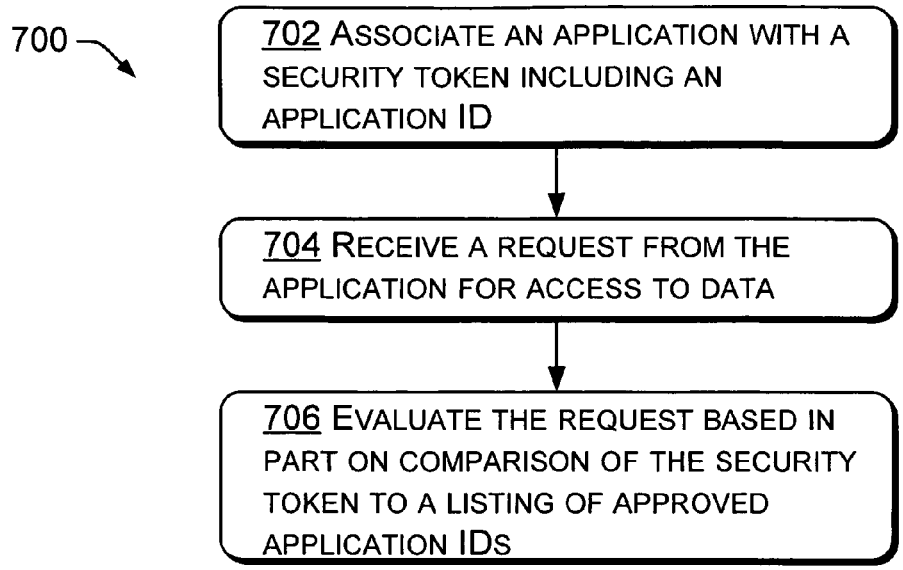
FIG. 7 is a flow diagram that describes an exemplary implementation, including a method employed for use in controlling an application attempting to access data.

FIG. 7 is a flow diagram 700 that describes an exemplary implementation, including a method employed for use in controlling an application attempting to access data. In particular, the method describes configuration of the application as a security principal with respect to certain data. In one embodiment, the application's status as a security principal means that the application's ID is included in a security token within the operating system's kernel as well as within an access control list associated with the data. Additionally, the method describes how decisions to honor requests for data made by the application are based in part on a comparison of the application ID from within the kernel with a list of approved application IDs within an access control list (ACL) associated with the data.

At block 702, an application is associated with a security token including the application's application ID, thereby configuring the application as a security principal. Referring again to the example of FIGS. 4 and 5, the application 408 is associated with a security token 412 including the application ID 504. During operation of the application 408, the security token 412 and the application 408 are associated in the kernel of the operating system.

At block 704, a request, typically made by the application and received by the operating system, requests access to data. In the example embodiment of FIG. 5, the application 408 makes a request for data access to the operating system (e.g. to OpenFile 513 in a Windows® environment), which in turn requests authorization from a security system function 514.

At block 706, the request to access data is evaluated based in part on comparison of the security token to a listing of approved application IDs. The example of FIG. 5 shows that the system security function 514 is configured to communicate with the access control list (ACL) 508. This communication allows the system security function 514 to compare the application ID 504 associated with the process 408 with the list of approved applications IDs 512 in the ACL. Note that the decision to allow or reject the request for data access may in one embodiment be based in part on a comparison of a user ID 502 with a list of approved user IDs 510.

Figure 8:
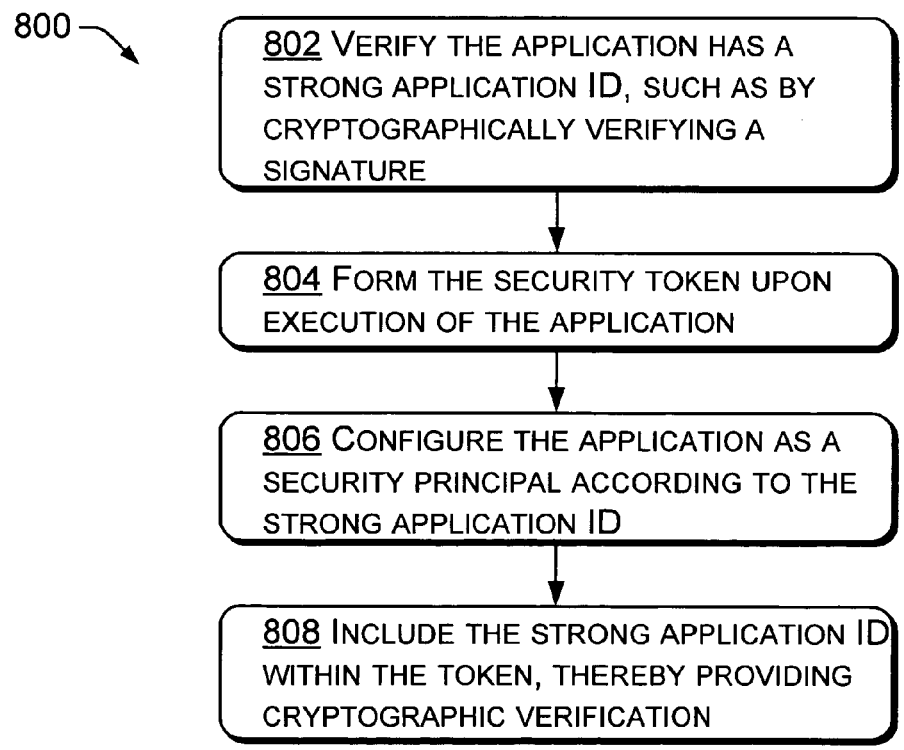
FIG. 8 is a flow diagram that describes an exemplary implementation by which block 702 of FIG. 7, or similar, may be performed.

FIG. 8 is a flow diagram 800 that describes an exemplary implementation by which an application is associated with a security token including an application ID based on a strong application ID, thereby configuring the application as a security principal. Accordingly, FIG. 8 provides one possible implementation of block 702 of FIG. 7.

At block 802, verification is made that an application ID of the application is a strong application ID. In a preferred embodiment, the verification is made cryptographically, such as by cryptographically verifying a signature. That is, an application ID 504 (FIG. 5) that has been cryptographically verified is a strong application ID 504. In embodiments illustrated by FIGS. 1-3, the strong name 118 can be used to derive the strong application ID.

At block 804, the security token is formed upon execution of the application. For example, FIG. 4 shows how the CreateProcess API 406, or some analogous part of the operating system in use, creates a new security token 412. As seen in FIG. 5, the security token 412 is associated with the process 408 in the kernel of the operating system.

At block 806, the application is configured as a security principal according to the strong application ID. In many implementations, the user is also configured as a security principal. At block 808, the strong application ID of the application is included within the security token, thereby providing a cryptographically verified identity for the application.

Figure 9:
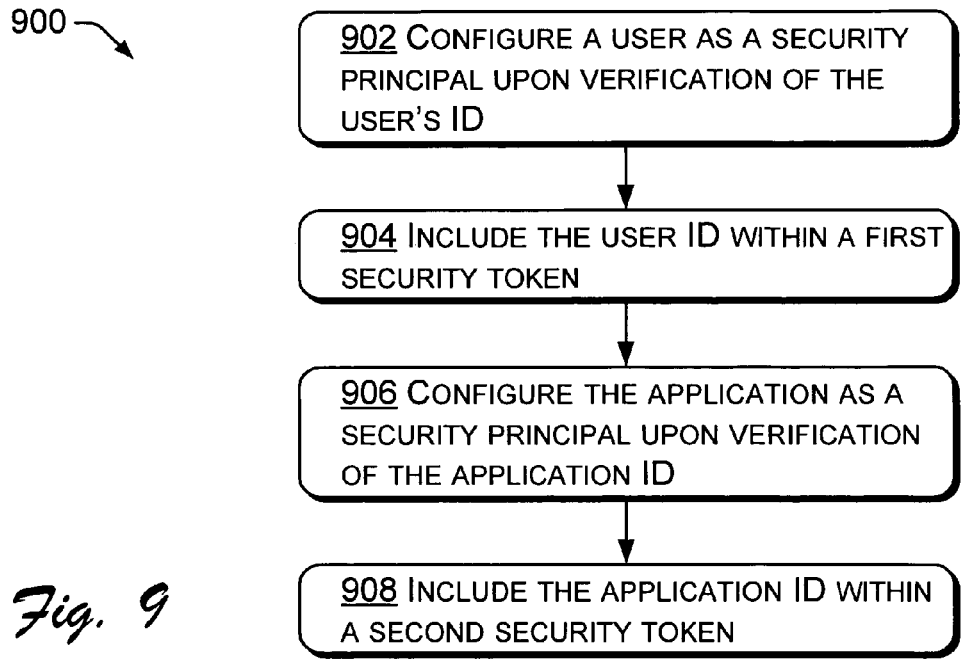
FIG. 9 is a flow diagram that describes a second exemplary implementation by which block 702 of FIG. 7, or similar, may be performed.

FIG. 9 is a flow diagram 900 that describes an exemplary implementation by which an application is associated with a security token including an application ID, thereby configuring the application as a security principal. Accordingly, FIG. 9 provides a second possible implementation of block 702 of FIG. 7. At block 902, a user is configured as a security principle upon verification of the user's ID. At block 904, the user ID is included within a first security token. For example, the existing token 410 seen in FIG. 4 was associated with a process by which the user logged on and provided identification (e.g. password, biometrics, etc.).

At block 906, the application is configured as a security principal upon verification of the application ID, and at block 908 the application ID is included within a second security token. Referring to FIG. 4, the CreateProcess API 406 (or similarly configured process in the operating system utilized) creates a new security token 412 for the new process 408, thereby configuring the application as a security principal. In the implementation of FIG. 5, the new security token contains a strong application ID 504, which is associated with the application 408 in the kernel of the operating system.

Figure 10:
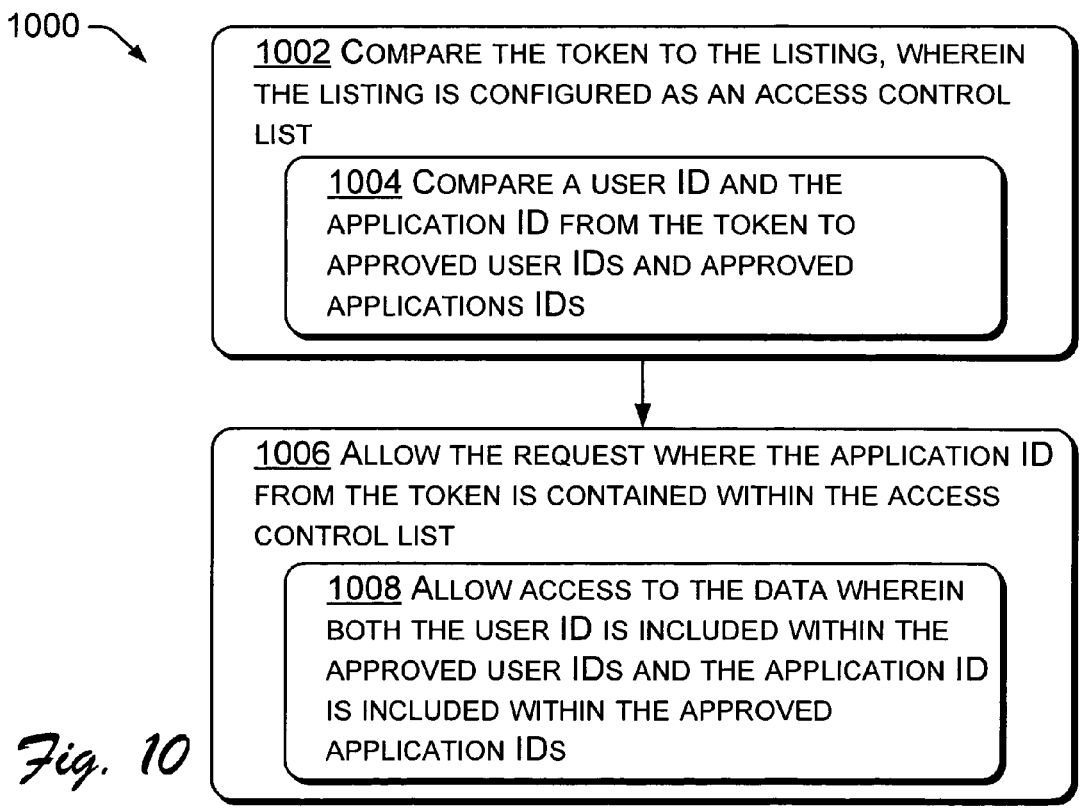
FIG. 10 is a flow diagram that describes methods by which block 706, or similar, of FIG. 7 may be performed.

FIG. 10 is a flow diagram 1000 that describes methods by which the request for access to data may be decided, based in part on comparison of the security token 412 to a listing of approved application IDs. Accordingly, FIG. 10 provides one possible implementation of block 706 of FIG. 7. At block 1002, the security token 412 is compared to the listing. In one example, the listing is configured as an ACL (access control list), such as the ACL 508 of FIG. 5. More specifically, block 1004 provides one implementation of block 1002, wherein a user ID and the application ID from the token are compared to the approved user IDs and approved application IDs. This can best be understood with reference to FIG. 5. The security token 412 includes the user ID 502 and application ID 504. These IDs may be compared to the access control list 508 associated with the data (e.g. file 506). The access control list 508 includes the list of approved user IDs 510 and list of approved application IDs 512. Accordingly, user ID 502 is compared to the listing of approved user IDs 510, and application ID 504 is compared to the listing of approved application IDs 512.

At block 1006, the request is allowed if the application ID from the security token is contained within the access control list. More specifically, as seen in FIG. 5, where application ID 504 is contained within the list of approved application IDs 512, then the request for access to the data (e.g. file 506) is approved. Note that block 1008 describes a typical implementation, wherein access to the data is allowed where both the user ID is included within the listing of approved user IDs and also the application ID is included within the listing of approved application IDs. In the example of FIG. 5, the typical implementation would required that user ID 502 is included within list of approved user IDs 510 of the ACL 508, and also that the application ID 504 is included within the listing of approved application IDs 512, before the process 408 is allowed to access to the data (file 506).

Figure 11:
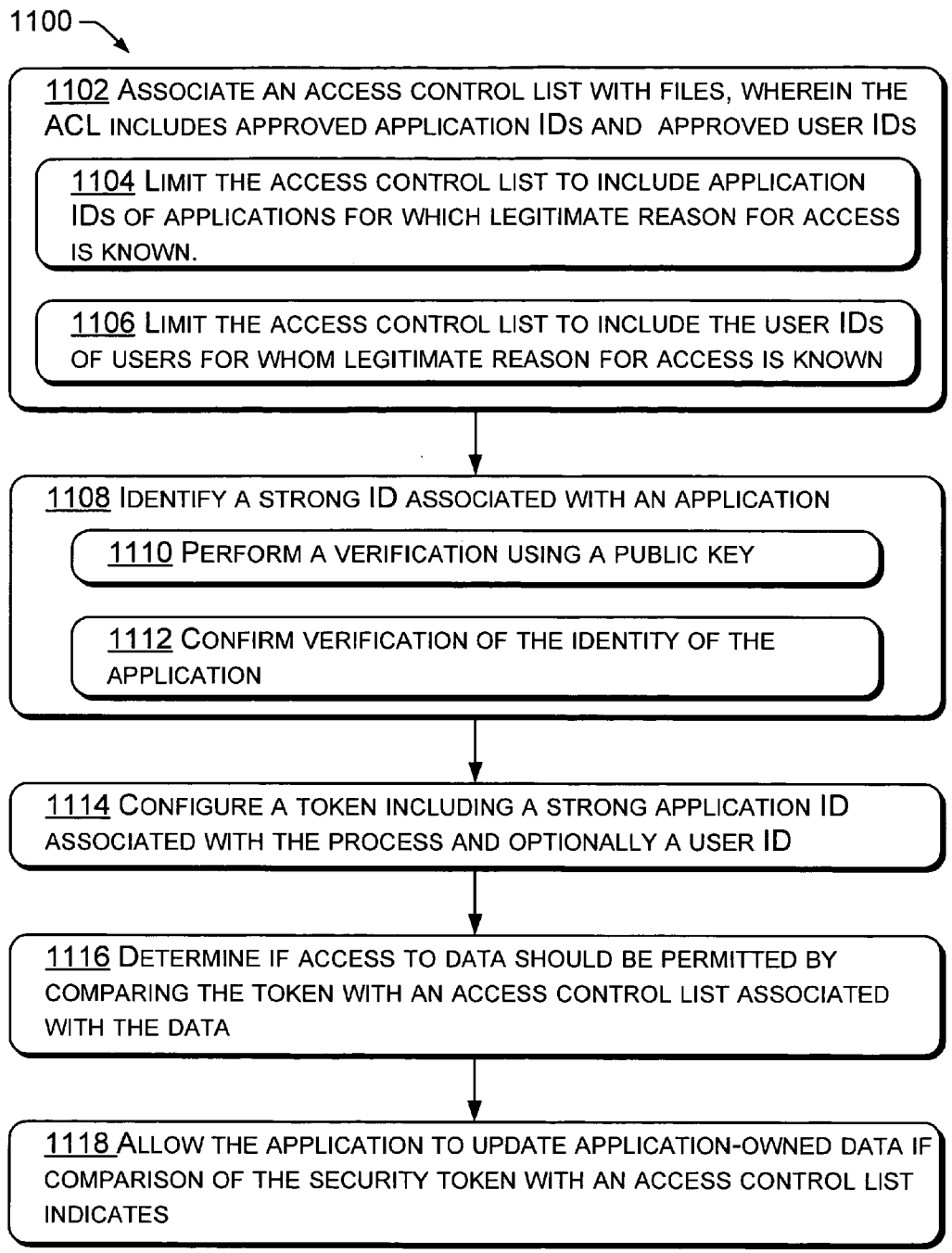
FIG. 11 is a flow diagram that describes an exemplary implementation, including a method by which files may be configured to protect data.

FIG. 11 is a flow diagram 1100 that describes a further exemplary implementation, and more particularly describes an exemplary method by which files may be configured to protect data. At block 1102, an access control list (ACL) is associated with files, wherein the ACL includes approved user IDs and approved application IDs. Referring to the example of FIG. 5, the file 506 is associated with the access control list 508 including a listing of approved user IDs 510 and a listing of approved application IDs 512. In exemplary implementations of block 1102, shown at blocks 1104 and 1106, the access control list 508 is limited to include user IDs 510 and application IDs 512 for which legitimate reason for reason for access to the data is known. Thus, every file 506 is associated with one or more users and one or more applications that have legitimate cause to access the file. Only these users and applications should be included within the access control list 508.

At block 1108, a strong application ID is identified. In one embodiment seen at block 1110, the identification is made cryptographically, such as by performance of a verification using a public key. At block 1112, a confirmation is made that the verification provides evidence of the identity of the application. Typically, the verification is made by comparing the result of the decryption to a known result, where a match indicates validity of the strong application ID.

At block 1114, a token is configured including a strong application ID associated with the process, and optionally including a user ID. Referring to FIG. 4, the CreateProcess API creates the new process 408 having a new security token 412. Referring to FIG. 5, the new security token 412 can include a user ID 502 and an application ID 504. The application ID is a strong application ID if it has been authenticated cryptographically.

At block 1116, a determination is made if access to data should be permitted by comparing the token with an access control list associated with the data. Referring to FIG. 5, the system security function 514 determines if the OpenFile API will be allowed to open the file 506. The determination is made by comparing the token 412 to the access control list 508. The application ID 504 is compared to the approved application IDs 512, and optionally the user ID 502 is compared to the approved user IDs 510. Where the comparison(s) made indicates, the system security function 514 will give permission to the OpenFile API to open the file 506.

At block 1118, the application is allowed to update its own application code files if comparison of the security token with the access control list indicates. For example, where the process 408 has access to the file 506, the process 408 can update the binary code and configuration data files, such as by downloading later revisions of this information via the Internet. Following the download, some or all of the acquired data may be stored in file 506.

Figure 12:
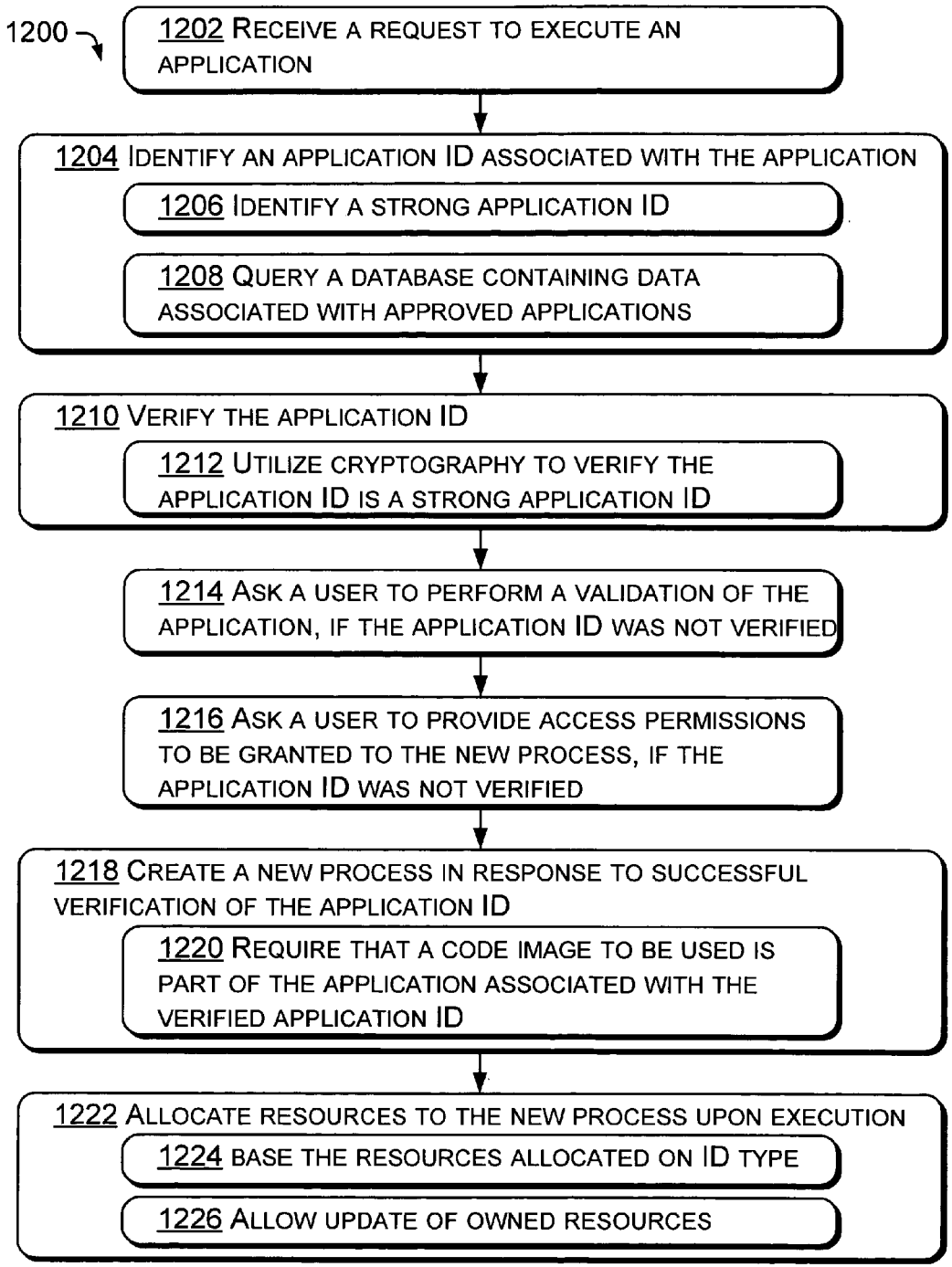
FIG. 12 is a flow diagram that describes an exemplary implementation, including a method by which permission to execute may be given or withheld from a new process.

FIG. 12 is a flow diagram 1200 that describes an exemplary implementation, including a method by which permission to execute may be given or withheld from a new process. At block 1202, a request to execute an application is received. Referring to FIG. 6, a call from an existing process 404 to the CreateProcess API 406 is typically made in response to a user double-clicking an icon associated with an application, but could be in response to an alternative event.

At block 1204, an application ID associated with the application is identified. Referring to FIG. 6, the identification may be made by the process-identifying security function 602. At block 1206, a strong application ID is identified. A strong name or strong application ID consists of the application's identity—its simple text name, version number, and culture information (if provided)—plus a public key and a digital signature. At block 1208, the application identity may be made by querying a database containing data associated with approved applications. Referring to FIG. 6, the database 604 is queried by the process-identifying security function 602. The database can be queried to identify strong or weak application IDs associated with applications that are allowed to execute. Strong application IDs may be cryptographically verified, while weak application IDs may be little more than the name of an application that is thereby given permission to execute.

At block 1210, an attempt is made to verify the application ID. In a preferred embodiment seen in block 1212, the application ID is verified using cryptography, thereby establishing a strong application ID.

At block 1214, if the application's ID was not verified, the user is asked to perform a validation of the application. Essentially, the user is asked to "vouch" for the authenticity and/or integrity of the application. For example, the large numbers of applications currently in use do not provide a strong application ID, and may be considered to be "legacy" applications. Where the user is certain that such a legacy application is benign, the user may validate the application in response to the request to do so, thereby establishing a weak application ID for the application. However, if the user uncertain about the origin and/or threat associated with the application, the user may withhold verification of the application's ID.

At block 1216, if the application's ID was not verified, the user is asked to provide access permissions to be granted to the new process. The access permissions indicate the files, objects, data etc. that the new process will be permitted to access. For example, the user can decide whether to give the new process access to an email address list, based on the reasonableness of the new process having a need to access that list.

At block 1218, where the application's ID was successfully verified, the application is executed by creating a new process associated with the application. Referring to FIG. 6, the new process 408 is created by the CreateProcess API 406 in response to success of the process-identifying security function in establishing an application ID. At block 1220, in establishing the new process, it is required that the code image to be used is part of the application associated with the verified application ID. Accordingly, the code within the new process 408 (FIG. 6) is known and trusted.

At block 1222, resources are allocated to the new process upon execution. In one embodiment seen at block 1224, the resources allocated are based on the type of ID established for the application from which the new process was formed. For example, where a strong application ID was established, more resources may be allocated than if a weak application ID was established. As seen in block 1226, the resources owned by the new process can be updated or otherwise altered by the new process.

Exemplary Computing Environment

Figure 13:
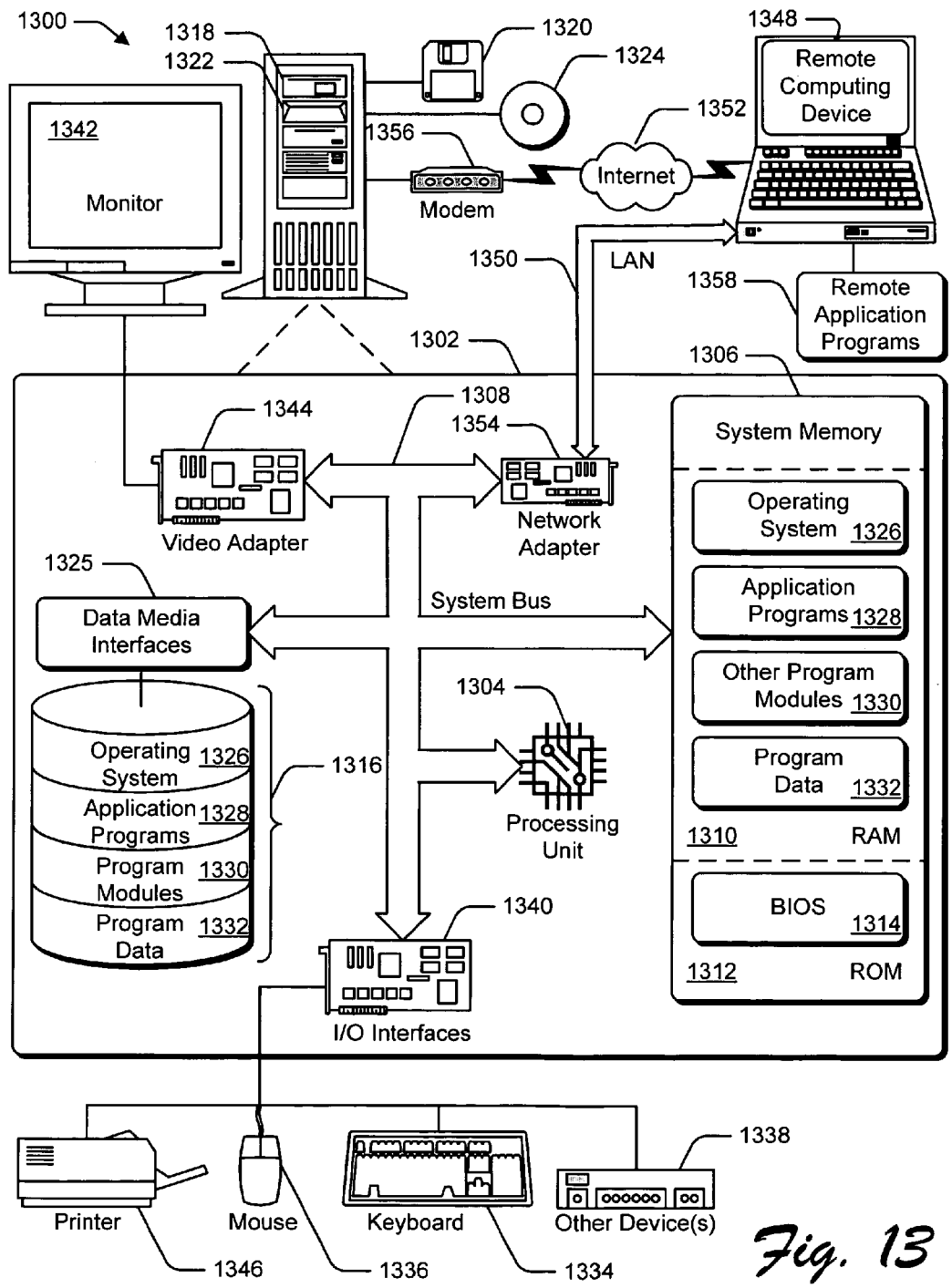
FIG. 13 illustrates an exemplary computing environment suitable for implementing controls on computer applications' permission to execute and permission access to data.

FIG. 13 illustrates an exemplary computing environment that can be configured to control computer applications' access to data, such as files, objects, directories, etc. Although one specific configuration is shown, other configurations are easily anticipated.

The computing environment 1300 includes a general-purpose computing system in the form of a computer 1302. The components of computer 1302 can include, but are not limited to, one or more processors or processing units 1304, a system memory 1306, and a system bus 1308 that couples various system components including the processor 1304 to the system memory 1306. The system bus 1308 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 1302 typically includes a variety of computer readable media. Such media can be any available media that is accessible by computer 1302 and includes both volatile and non-volatile media, removable and non-removable media. The system memory 1306 includes computer readable media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is stored in ROM 1312. RAM 1310 typically contains data and/or program modules that are immediately accessible to and/or presently operated on by the processing unit 1304.

Computer 1302 can also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1325. Alternatively, the hard disk drive 1316, magnetic disk drive 1318, and optical disk drive 1322 can be connected to the system bus 1308 by a SCSI interface (not shown).

The disk drives and their associated computer-readable media provide non-volatile storage of computer readable instructions, data structures, program modules, and other data for computer 1302. Although the example illustrates a hard disk 1316, a removable magnetic disk 1320, and a removable optical disk 1324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1316, magnetic disk 1320, optical disk 1324, ROM 1312, and/or RAM 1310, including by way of example, an operating system 1326, one or more application programs 1328, other program modules 1330, and program data 1332. Each of such operating system 1326, one or more application programs 1328, other program modules 1330, and program data 1332 (or some combination thereof) may include an embodiment of a caching scheme for user network access information.

Computer 1302 can include a variety of computer/processor readable media identified as communication media. Communication media typically embodies computer readable instructions, data structures, program modules, or other data in a transport mechanism and includes any information delivery media.

A user can enter commands and information into computer system 1302 via input devices such as a keyboard 1334 and a pointing device 1336 (e.g., a "mouse"). Other input devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor 1342 or other type of display device can also be connected to the system bus 1308 via an interface, such as a video adapter 1344. In addition to the monitor 1342, other output peripheral devices can include components such as speakers (not shown) and a printer 1346 which can be connected to computer 1302 via the input/output interfaces 1340.

Computer 1302 can operate in a networked environment using logical connections to one or more remote computers, such as a remote computing device 1348. By way of example, the remote computing device 1348 can be a personal computer, portable computer, a server, a router, a network computer, a peer device or other common network node, and the like. The remote computing device 1348 is illustrated as a portable computer that can include many or all of the elements and features described herein relative to computer system 1302.

Logical connections between computer 1302 and the remote computer 1348 are depicted as a local area network (LAN) 1350 and a general wide area network (WAN) 1352. Such networking environments are commonplace in offices, enterprise-wide computer networks, intranets, and the Internet. When implemented in a LAN networking environment, the computer 1302 is connected to a local network 1350 via a network interface or adapter 1354. When implemented in a WAN networking environment, the computer 1302 typically includes a modem 1356 or other means for establishing communications over the wide network 1352. The modem 1356, which can be internal or external to computer 1302, can be connected to the system bus 1308 via the input/output interfaces 1340 or other appropriate mechanisms. It is to be appreciated that the illustrated network connections are exemplary and that other means of establishing communication link(s) between the computers 1302 and 1348 can be employed.

In a networked environment, such as that illustrated with computing environment 1300, program modules depicted relative to the computer 1302, or portions thereof, may be stored in a remote memory storage device. By way of example, remote application programs 1358 reside on a memory device of remote computer 1348. For purposes of illustration, application programs and other executable program components, such as the operating system, are illustrated herein as discrete blocks, although it is recognized that such programs and components reside at various times in different storage components of the computer system 1302, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-storage media comprising computer-executable instructions for executing an application, the computer-executable instructions comprising instructions for:
  identifying an application ID associated with the application, the application ID being a strong application ID or a weak application ID, identifying a strong application ID comprising querying a database containing information indicating applications having strong application IDs for a match, the database additionally associating user IDs and application IDs for which legitimate reason for access to protected data is known, the strong application ID comprising a text name plus a public key and a digital signature;
  verifying the application ID, wherein verifying the application ID comprises utilizing cryptography to verify the application ID is a strong application ID;
  creating a new process in response to successful verification of the application ID;
  associating the new process with a new security token comprising the identified application ID and a user ID, wherein the associating comprises creating the new security token using input from an existing security token, creating the new security token from the existing security token comprising:
    running a first process on an interactive desktop;
    generating the existing security token as part of a process of logging a user on;
    responding to an attempt by the first process to create the application by accessing, by operation of an API, the existing security token, together with information from an application info store; and
    creating, by operation of the API, the new security token for the application, the new security token comprising all information from the existing security token augmented with an application ID of the application, the application ID being provided by the application info store from data obtained from an application manifest; and
  allocating resources to the new process, upon execution of the new process having either a strong ID or a weak ID, the allocating being based at least in part on whether the application ID is verified as a strong application ID or a weak application ID, such that if a strong application ID was established, more resources are allocated than if a weak application ID was established.

2. The one or more computer-storage media as recited in claim 1, wherein creating the new process comprises instructions for:
  requiring that a code image to be used is part of the application associated with the verified application ID.

3. The one or more computer-storage media as recited in claim 1, additionally comprising instructions for:
  asking a user to perform a validation of the application, if the application ID could not be verified.

4. The one or more computer-storage media as recited in claim 1, additionally comprising instructions for:
  asking a user to provide access permissions to be granted to the new process, if the application ID was not verified.

5. One or more computer-storage media comprising computer-executable instructions for identifying an application as a prerequisite for execution of the application, the computer-executable instructions comprising instructions for:
  receiving a request to execute the application from an existing process;
  identifying an application ID associated with the application;
  attempting to verify the application ID; and
  associating the application with a new security token comprising the application ID and a user ID, wherein the associating comprises creating the new security token using input from an existing security token associated with the existing process, creating the new security token from the existing security token comprising:
    running a first process on an interactive desktop;
    generating the existing security token as part of a process of logging a user on;
    responding to an attempt by the first process to create the application by accessing, by operation of an API, the existing security token, together with information from an application info store; and
    creating, by operation of the API, the new security token for the application, the new security token comprising all information from the existing security token augmented with an application ID of the application, the application ID being provided by the application info store from data obtained from an application manifest;
  wherein establishing the application ID as either a strong application ID or a weak application ID:
    querying a database containing both weak and strong applications IDs associated with processes having permission to operate on a computer on which the computer-executable instructions are executing, the database additionally associating user IDs and application IDs for which legitimate reason for access to protected data is known, the query establishing the application ID if the application ID is contained within the database;
    establishing, upon failure of the database to contain the application ID, a weak application ID by querying a user of the computer for permission to execute the application; and
    where the application ID was verified, executing the application by allocating more resources to the application where a strong application ID was established than where a weak application ID was established.

6. The one or more computer-storage media as recited in claim 5, wherein identifying the application ID associated with the application comprises instructions for:
  querying a database containing data comprising strong application IDs and weak application IDs associated with approved applications.

7. The one or more computer-storage media as recited in claim 5, wherein executing the application comprises instructions for:
  requiring that a code image to be used in the execution is part of the application associated with the verified application ID.

8. The one or more computer-storage media as recited in claim 5, additionally comprising instructions for:
  asking a user to perform a validation of the application, if the application ID was not verified.

9. The one or more computer-storage media as recited in claim 5, additionally comprising instructions for:
  asking a user to provide access permissions to be granted to the application, if the application ID was not verified.

10. The one or more computer-storage media as recited in claim 5, additionally comprising instructions for:
  conferring ownership of objects to an application running in a new process upon execution and allowing the new process to update files owned by the application.

11. A system for executing a new process, comprising:
a computing system within which an existing process may create the new process;
an application ID associated with a new security token associated with the new process; and
a process-identifying security function, comprising computer-executable instructions defined on a computer-readable media, which when executed:
  receive, from an existing process, a request to execute the new process;
  identify the application ID associated with the new process; and
    perform the process-identifying security function, the process-identifying security function configured to make a decision to allow or prevent creation of the new process, wherein the decision is made based on verification of the application ID;
    associate the new process with the new security token, wherein the new security token comprises the application ID and a user ID, wherein the associating comprises creating the new security token using information from an existing user security token that is associated with the existing process, augmented with the application ID, creating the new security token from the existing security token comprising:
  running a first process on an interactive desktop;
  generating the existing security token as part of a process of logging a user on;
  responding to an attempt by the first process to create the application by accessing, by operation of an API, the existing security token, together with information from an application info store; and
  creating, by operation of the API, the new security token for the application, the new security token comprising all information from the existing security token augmented with an application ID of the application, the application ID being provided by the application info store from data obtained from an application manifest; and
establishing the application ID as either a strong application ID or a weak application ID:
  query a database containing both weak and strong applications IDs associated with processes having permission to operate on the computing system on which the computer-executable instructions are executing, the database additionally associating user IDs and application IDs for which legitimate reason for access to protected data is known, the query establishing the application ID if the application ID is contained within the database;
  establish, upon failure of the database to contain the application ID, a weak application ID by querying a user of the computer for permission to execute the application; and
  allocate, by operation of the process-identifying security function, resources to the new process, upon execution of the new process, the allocating being based at least in part on whether the application ID is verified as a strong application ID comprising a text name plus a public key and a digital signature, or a weak application ID, the allocating being performed such that if a strong application ID was established, more resources are allocated than if a weak application ID was established.

12. The system as recited in claim 11, wherein the application ID associated with the application comprises:
  a strong application ID; and
  wherein the process-identifying security function utilizes cryptography to verify the strong application ID.

13. The system as recited in claim 11, wherein the process-identifying security function is additionally configured to query a database containing data associated with approved applications.

14. The system as recited in claim 11, wherein the process-identifying security function is additionally configured to query a user to perform a verification of the application ID when the application ID is not otherwise verifiable.

15. The system as recited in claim 11, additionally comprising:
  a create process function configured to create the new process only in response to the decision by the process-identifying security function; and
  wherein the create process function is additionally configured to require that a code image to be used is part of the application associated with the verification of the application ID.

* * * * *